Aug. 3, 1965   J. B. BEACH   3,198,461
RETRACTABLE LANDING GEAR
Filed June 20, 1963   6 Sheets-Sheet 3

INVENTOR.
JAMES B. BEACH
BY
Agent

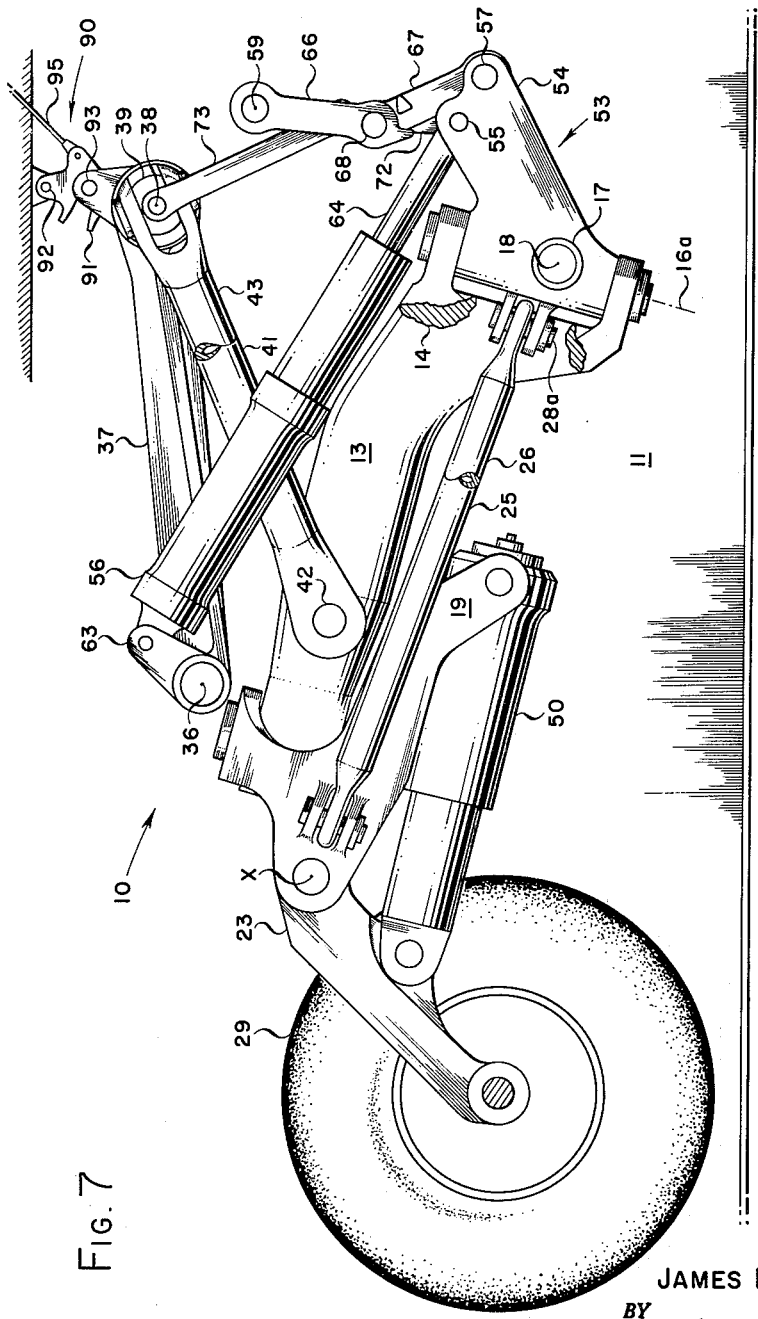

3,198,461
RETRACTABLE LANDING GEAR
James B. Beach, Van Nuys, Calif., assignor to Lockheed Aircraft Corporation, Burbank, Calif., a corporation of California
Filed June 20, 1963, Ser. No. 289,362
8 Claims. (Cl. 244—102)

This invention relates to an aircraft landing gear and more particularly to a retractable landing gear for an aircraft having a plurality of wheels which are carried on a bogie by a parallelogram linkage arrangement to provide a configuration furnishing excellent lateral stability for an aircraft and being more particularly adapted to be attached to the fuselage at a location close to and spanning the longitudinal center of the fuselage.

Conventional landing gear for aircraft usually employs an oleo member which is swingable for raising and lowering the gear. When the gear is extended, the oleo member must assume a nearly vertical position relative to the plane of the landing surface for absorbing the landing loads. With such conventional gear arrangement, it is a practical necessity to either mount the main gear on opposite sides of the longitudinal axis of the airplane or in the wing to provide sufficient lateral stability for the aircraft when on the ground.

The modern concept in aircraft design requires the use of relatively thin wings which cannot efficiently accommodate the main landing gear structure since there is not sufficient space inside such wings for enclosing the gear when retracted. Thus, the expedient of mounting the main gear in the fuselage of relative thin winged aircraft and employing small auxiliary landing gear in the outboard ends of the wings has been an accepted practice, being recognized as one of the solutions heretofore available.

An object of this invention is to provide a retractable aircraft landing gear which is adapted to be mounted on the fuselage and which will, in the extended position, project downwardly and outwardly from the fuselage to provide excellent lateral stability for the aircraft when on the ground; stability of the same order as that which is obtained by the use of conventional gear mounted in the wing.

Another object of this invention is to provide an aircraft landing gear of the retractable type which will accommodate a dual wheel arrangement for the efficient use of the gear on relatively large transport aircraft.

Another object of this invention is to provide a new and improved landing gear having an arrangement of the various elements which will allow the gear to be retracted into a relatively small space and which, in the extended position, becomes an efficient load supporting structure.

Another object of this invention is to provide a new and improved aircraft landing gear which will allow the gear to be extended and retracted from a single suspension means so as to permit a more efficient structural arrangement near the center of gravity of the airplane in the extended and retracted position of the landing gear.

A further object of this invention is to provide a new and improved aircraft landing gear which provides a single actuating cylinder and actuating linkages therefor connected to the actuating cylinder so as to actuate the landing gear to be positioned in its extended position and its retracted position by the single actuating cylinder.

Still another object of this invention is to provide an aircraft landing gear having a bogie type wheel suspension system and including means for maintaining the bogies in the proper attitude for making initial ground contact, and throughout all ground contact conditions.

These and other objects of this invention will become more apparent from the following detailed description, drawings, an appended claims.

In the drawings:

FIGURE 7 is a view similar to FIGURES 2 and 5, with parts thereon shown in a fully retracted position.

Figure 1:
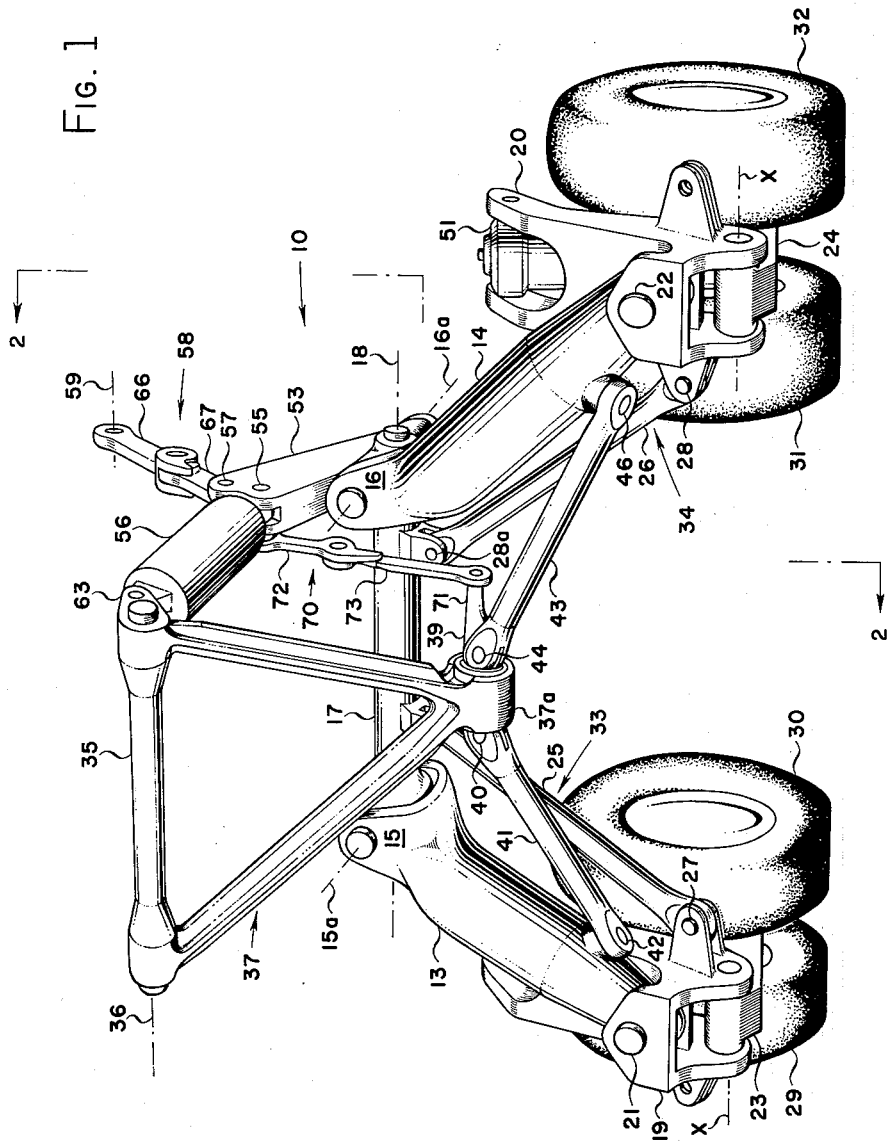
FIGURE 1 is a perspective view of the landing gear of this invention illustrated in its fully extended position, with ground contact static load being on the gear.

Referring in detail to the drawings, there is shown by way of illustration, but not of limitation, a retractable landing gear designed and constructed in accordance with this invention and generally referred to by the numeral 10. In its usual application the landing gear 10 is adapted to be carried in a wheel well 11 (FIGURES 2 and 5), formed on the central longitudinal axis (not shown) of a fuselage. The landing gear 10 includes a pair of leg or main landing gear members 13 and 14, each swingably carried at one of its respective ends 15 and 16 by a first fulcrum fitting 17 pivotally secured for rotation about a fixed axis 18 perpendicular to the longitudinal axis of the fuselage. Legs 13 and 14 are pivotable about their transverse axes 15a and 16a, respectively, to position the legs in a first or intermediate retracted position, shown in FIGURE 4, wherein the legs 13 and 14 are substantially parallel. The legs are also pivotable, by means to be hereinafter described, about the axis 18 into a fully retracted position whereby the landing gear 10 may be stowed in their parallel relationship in the wheel well 11 and so as to occupy a minimum of space therein.

In the fully extended position, shown most clearly in FIGURE 1, the legs 13 and 14 are pivoted about the axes 15a and 16a, respectively, into their fully extended position, the legs 13 and 14 projecting angularly downward and outward, on either side of the longitudinal axis of the aircraft. The gear 10 thereby provides adequate stability when the aircraft is supported by the landing gear on the ground.

The legs 13 and 14 have outer free ends carrying knuckle fittings 19 and 20, respectively. Hence, except as restrained by shock struts 50 and 51 hereinafter described, each bogie is free to swing about an axis, designated as X, normal to the aircraft longitudinal axis. The bogie plane of rotation is usually perpendicular to the ground in ordinary use of the landing gear 10 and in gear extension and retraction movement, as will be hereinafter described in detail.

The knuckle fittings 19 and 20 are stabilized through the use of the control rods 25 and 26, respectively, which pivotally connect thereto at one of their ends through the pins 27 and 28. The other ends of the control rods 25 and 26 are pivotally connected to the fulcrum fitting 17 by means of the pins 27a and 28a, respectively. Each rod 25 and 26 completes a parallelogram linkage 33 and 34, respectively, with its respective leg members 13 or 14.

In the extended position this fixes the knuckle fittings 19 and 20 such that axis X remains normal to the aircraft longitudinal axis and at the same time allows the bogies 23 and 24 to swing in a plane usually normal to the ground and always parallel to the aircraft centerline plane, as required for absorbing shock loads. The leg members 13 and 14 together may be considered simply as a pair of legs, each forming a portion of a parallelogram linkage 33 and 34 which provides support for the bogies 23 and 24, respectively. Bogie 23 is shown as carrying a pair of wheels 29 and 30, and bogie 24 is shown as carrying wheels 31 and 32.

A second fulcrum fitting 35 is provided for pivotal movement about a shaft on a fixed axis 36 parallel to the axis 18 of the fulcrum fitting 17 and normal to the longitudinal axis of the aircraft. The fitting 35 forms one side of a triangularly-shaped truss 37 having an apex 37a, located at a second axis of rotation 38 (FIGURE 4) and spaced from the axis 36 so as to revolve about the axis 36 in parallel relationship thereto. The apex 37a receives a shaft 39 rotatable about the axis 38 and having one end connected by a pivot pin 40 to an end of a link 41. The other end of the link 41 is pivotally connected by a self-aligning connection 42, such as a ball and socket, to the leg 13. A second end of the shaft 39 is pivotally connected by a pin 44 to one end of a second link 43, the opposite end of link 43 being pivotally connected to leg 14 by, for example, a ball and socket connection 46. When the truss 37 is rotated about its axis 36, the axis 38 revolves therearound to cause, through interaction of the links 41 and 43, the legs 13 and 14 to pivot about their respective axes 15a and 16a either towards or away from each other. When the truss 37 is pivoted upwardly around its axis 36, the axis 38 revolves upwardly. This causes the legs 13 and 14 to pivot about their respective axes 15a and 16a from the angular, downwardly-extending position of FIGURE 1 into the position shown in FIGURE 4, wherein the leg members 13 and 14 are substantially parallel. Conversely, when the truss 37 is pivoted downwardly, about its axis 36, the axis 38 revolves in a downward direction to cause the links 41 and 43 to spread the legs 13 and 14 into their spanwise, extended position, illustrated in FIGURE 1. By the parallelogram linkages 33 and 34, the pairs of wheels 29, 30 and 31, 32 are also retained in a substantially vertical position, with their axes parallel to the axis 18, regardless of the position of the truss 37.

Figure 2:
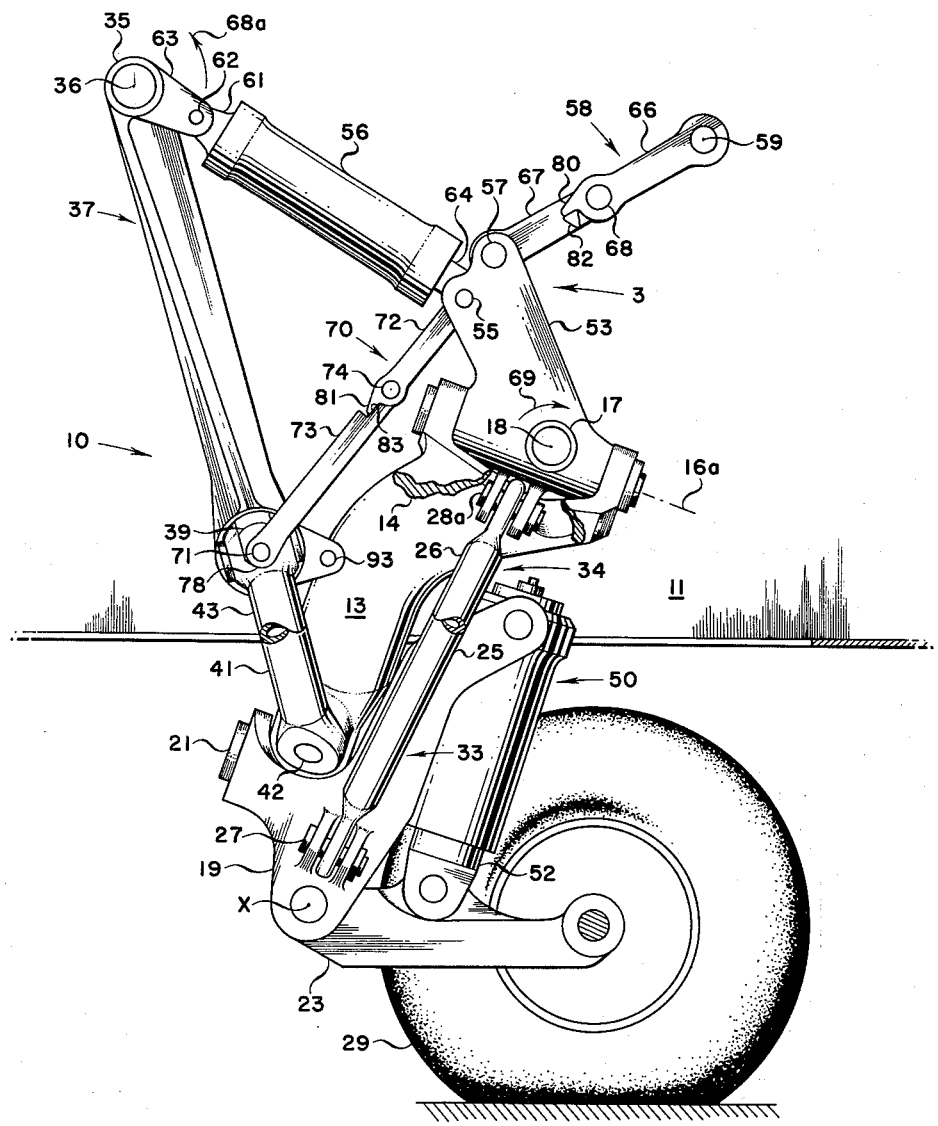
FIGURE 2 is an elevational cutaway view as taken substantially along the line 2—2 of FIGURE 1, one wheel of the remaining dual arrangement being further cut away to illustrate the internal mechanism.

A shock strut 50 (FIGURE 2) is provided for the leg 13 and a shock strut 51 (FIGURE 1) is provided for leg 14. The shock strut 50 is pivotally connected between the knuckle fitting 19 and the bogie 23 and the shock strut 51 is pivotally connected at its opposite ends between the knuckle 20 and its associated bogie 24. Each strut absorbs the shock from its individual landing wheels in a direction substantially perpendicular to the axis of rotation of its wheels. The shock struts 50 and 51 are held erect in the position substantially perpendicular to the axis of rotation of the wheel members during movement of the legs 13 and 14 by the respective parallelogram linkages 33 and 34. FIGURE 2 illustrates one of the shock struts 50 in a static load position, as when the aircraft is on the ground, and FIGURE 5 illustrates the shock strut 50 in an extended position, as when the aircraft is airborne.

Figure 3:
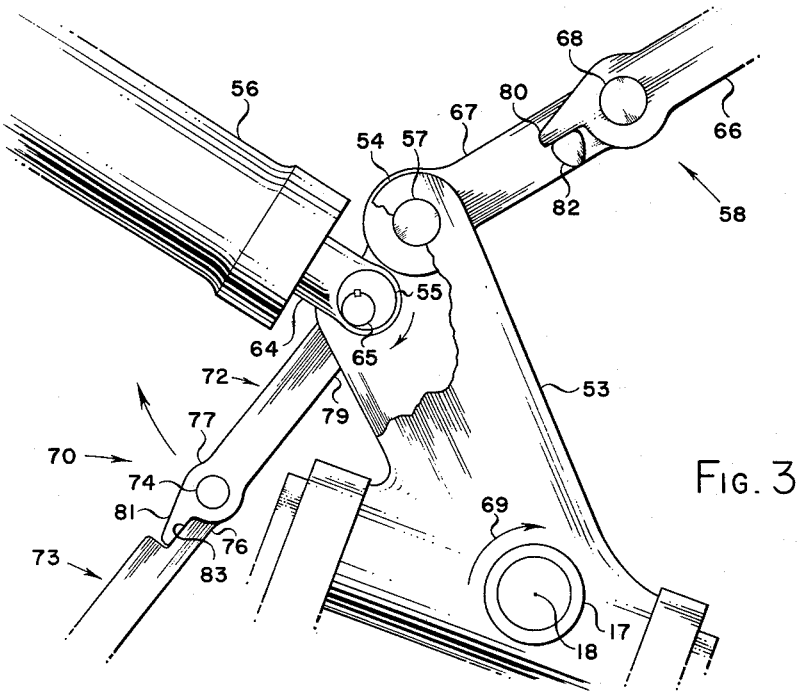
FIGURE 3 is an enlarged view of the area indicated by the arrow 3 of FIGURE 2.
Figure 4:
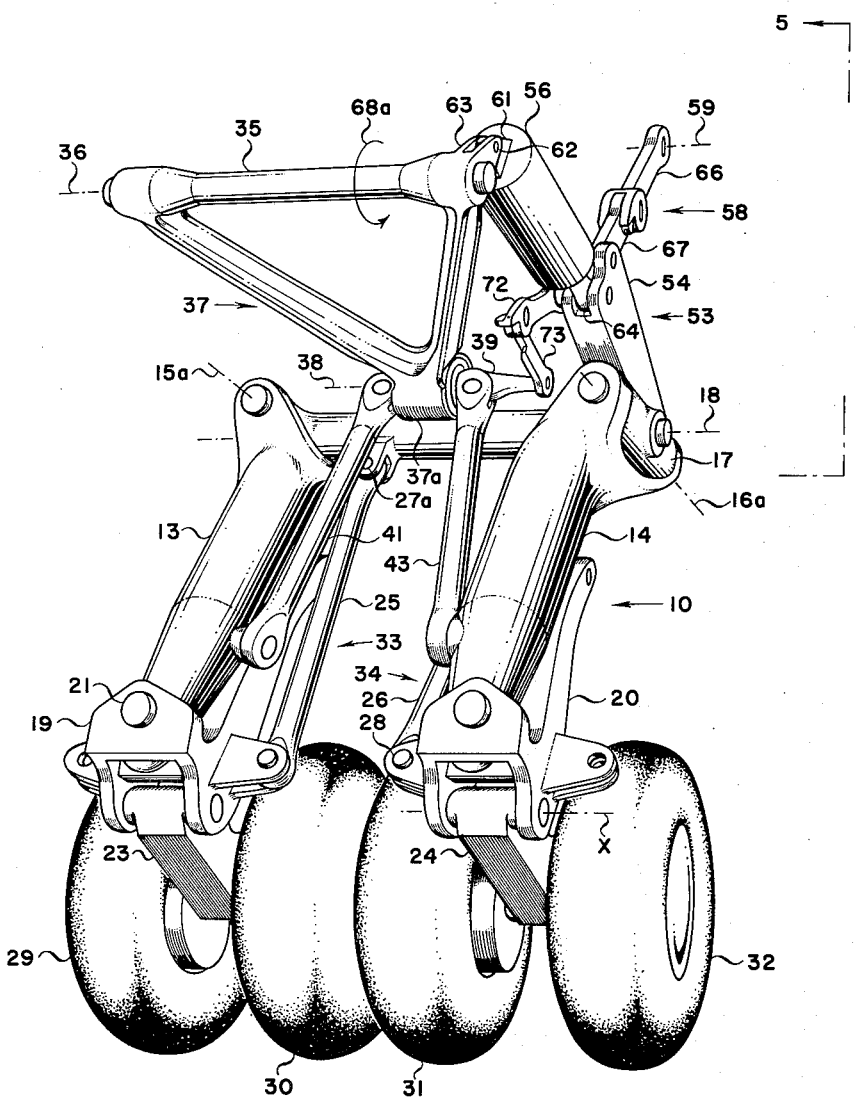
FIGURE 4 is a perspective view, similar to FIGURE 1, with the landing gear in an intermediate position wherein the gear is ready for the final phase of retraction, the ground control load being off the gear.
Figure 5:
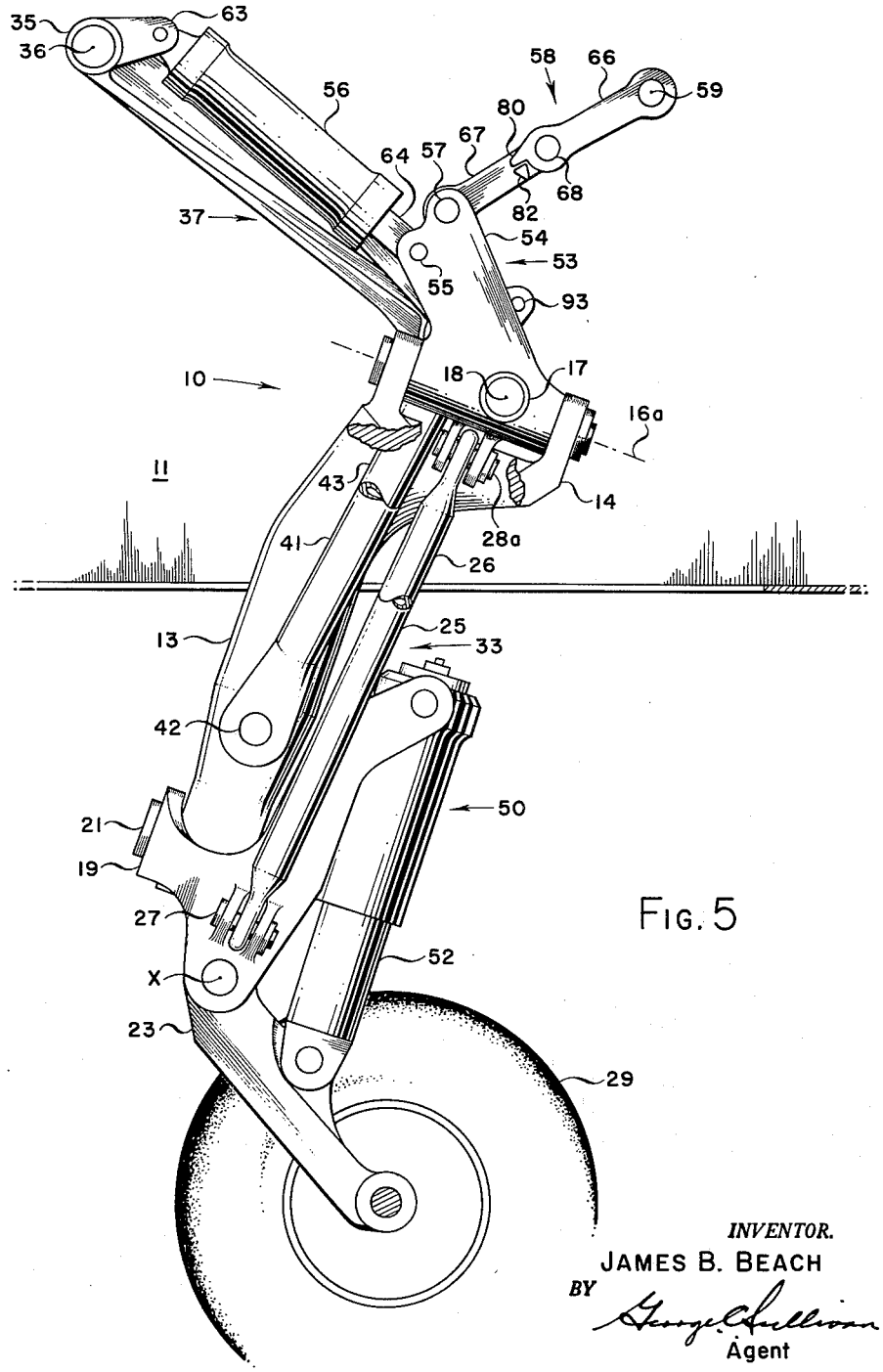
FIGURE 5 is a vertical cutaway view similar to FIGURE 2 as viewed substantially along the arrowed lines 5—5 of FIGURE 4.

A lever 53 is secured to or integrated with the fulcrum fitting 17 for pivoting the fitting 17 about the axis 18 and swinging the legs 13 and 14 from the position illustrated in FIGURES 4 and 5, upward to the position best illustrated in FIGURE 7, wherein the wheel assemblies are retracted into the wheel well 11 of the aircraft. The lever 53 extends generally perpendicular from the fulcrum fitting 17 and includes an outer bifurcated end 54 pivotally connected through an eccentric crank pin 55 (FIGURE 3) to the piston rod 64 of an actuating cylinder 56. It is also secured by an adjacent pivot pin 57 to one end of a link means or down-lock 58. The other end of the down-lock 58 is pivotally secured to aircraft structure (not shown) about a fixed axis 59 spaced in parallel relation from the axes 36 and 18.

The actuating cylinder 56 has its end 61, which is remote from the piston rod 64, pivotally secured by a pin 62 to a bifurcated arm 63 (FIGURE 4). The arm 63 is fixed to the fulcrum fitting 35 for rotation therewith around the axis 36.

Figure 6:
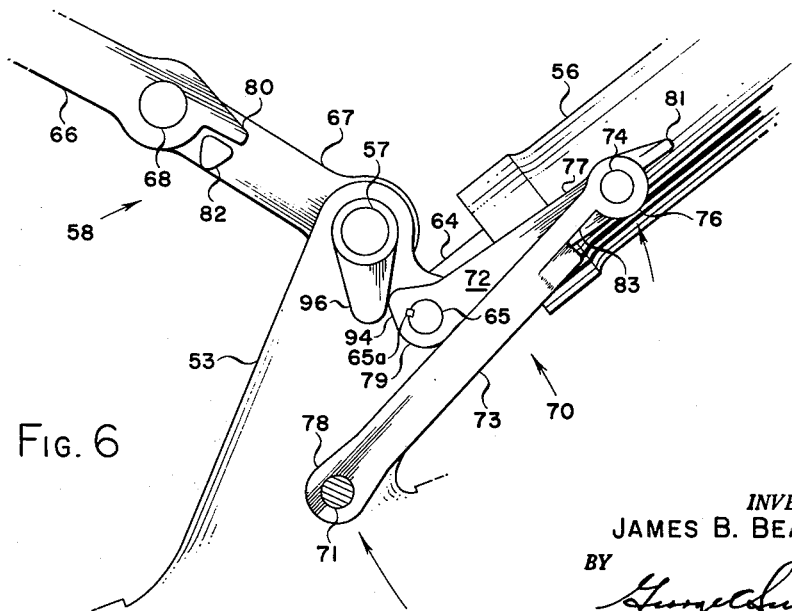
FIGURE 6 is a view similar to FIGURE 3, viewed from the opposite side, with parts thereof being shown in a changed position and broken away for greater clarity.

The crank pin 55 has its main body portion positioned between the bifurcations of lever 53. Offset portions 65, one of which is shown in FIGURE 3, extend outward from its ends and are rotatably mounted in the adjacently spaced bifurcations upon end 54 of the lever 53. The actuating cylinder 56 is of the double-acting type and is adapted to be connected to a fluid pressure and control means, not shown, so that the piston rod 64 may be extended and retracted. The linkage means or downlock 58 includes a pair of links 66 and 67 pivotally connected at adjacent inner ends by a pin 68. In response to actuation of the cylinder 56 to retract landing gear 10, the links 66 and 67, in a manner to be hereinafter described, move from the locking, over-center position shown in FIGURE 3, where a lug 80 is in contact with a stop 82, to the unlocked over-center position shown in FIGURE 6.

A linkage means 70 includes a pair of links 72 and 73 pivotally connected by means of a pin 74 between adjacent ends 76 and 77 thereof. The linkage means 70 has one of its ends 79 connected by means of a key 65a to one of the offset portions 65 of crank pin 55 (FIGURE 6) and its other end 78 pivotally connected to an extension 71 on the shaft 39. In the over-center locked position linkage 70, acting through shaft 39, fixes truss 37 from rotation about axis 36.

During the retraction of the landing gear 10, the actuating cylinder 56 is pressurized to cause the extension of the piston rod 64. The first increment of extension of the rod 64 exerts a force against the central portion of the crank 55, causing rotation of the offset portions 65 and swinging the link 72 upwardly to move a lug 81 out of contact with a stop member 83 and break the over-center locked position of linkage 70.

This action also unlocks the truss 37 which was held in fixed position by the over-center locking of the linkage 70. Continued extension of the piston rod 64 results in a folding of the linkage 70 and causes rotation of the truss 37 about axis 36.

Responsive to the rotation of the crank 55 the offset portions 65 move into alignment with the longitudinal axis of the rod 64. At this point, down-lock 58 is still in its locked postion stabilizing the position of lever 53. Continued extension of the rod 64 causes a net effective force to be applied to the arm 63 so that it pivots about the axis of rotation 36 of the fulcrum fitting 35 in the direction indicated by the arrowed line 68a (FIGURE 2). This swings apex 37a of the truss 37 in an upwardly, inwardly extending arc and causes the links 41 and 43 to pull the legs 13 and 14, respectively, inwardly from their distended positions. As the apex 37a moves upward, the link 73 is folded towards link 72 which also moves upward. As the fitting 37 continues to swing about the axis 36 in the direction of arrow 68a, the legs 13 and 14 continue to pivot about their respective transverse axes of rotation 15a and 16a into the position shown in FIGURE 4 and the link 73 continues to fold toward the link 72 into the position shown in FIGURE 6. The folding of links 72 and 73 into the position of FIGURE 6 causes a cam surface 94 upon end 79 of the arm 72 to engage a cam-riding lug 96 which is affixed to the link 67 through the pin 57. The resulting rotation of the lug 96 and the link 67 moves the adjacent inner ends of the links 66 and 67 upward and interrupts the over-center locking engagement, thereby unlatching the down-lock 58 to permit the rod 64 to move the lever 53. Continued extension of the rod 64 causes lever 53 to swing in the direction indicated by the arrowed line 69.

It pivots about the axis 18 in such a manner that a force is transmitted to the legs 13 and 14, swinging them about the fixed axis 18 and thereby positioning them as illustrated in FIGURE 7, the final retracted position.

In the retracted position of FIGURE 7, an uplock latch 90, having a pivotable hook 91 secured as at 92 is engageable with a pin 93. The pin 93 is secured to the apex portion 37a of the truss 37 to retain the landing gear 10 in its retracted position. A cable 94 or other actuating means may be provided for releasing the latch 90 from the pin 93 preparatory to lowering the landing gear 10.

The lowering of landing gear 10 is, in general, the reverse of the retraction above described. To lower landing gear 10, actuating cylinder 56 is pressurized in a manner to retract the rod 64 causing the legs 13 and 14 to be pivoted downward about the axis 18 while remaining in their substantially parallel relationship. Further retraction of rod 64 moves the legs 13 and 14 into the distended position shown in FIGURE 1.

While the instant invention has been shown and described herein in what is conceived to be the most practical and preferred embodiment, it is recognized that departures may be made therefrom within the scope of the invention which is therefore not to be limited to the details disclosed herein but is to be afforded the full scope of the claims.

I claim:
1. A retractable landing gear for an airborne vehicle comprising:
   (a) a first fulcrum fitting mounted upon the vehicle for rotation about a first fixed axis transverse to and fixed with respect to the longitudinal center line of the vehicle;
   (b) a pair of leg members having first ends attached to said first fulcrum fitting to rotate therewith about said first fixed axis and to swivel with respect thereto about axes normal to said first fixed axis;
   (c) a second fulcrum fitting mounted upon the vehicle for rotation about a second fixed axis parallel to said first fixed axis;
   (d) linkage means connecting said second fulcrum fitting to said leg members opposite said leg attachments to said first fulcrum fitting for controlling the transverse orientation of said legs responsive to rotation of said second fulcrum fitting;
   (e) actuating means connected to said first and said second fulcrum fittings for rotating the same, whereby said leg members are movable inward and upward by a single said actuator; and
   (f) a plurality of wheels perpendicularly mounted about a common axis upon the leg members adjacent linkage connections so as to remain at all times substantially perpendicular to the axes.

2. A retractable landing gear for an aircraft having a fuselage and a wheel-well formed on the central longitudinal axis of the fuselage comprising:
   (a) a first fulcrum fitting pivotally mounted in the wheel-well for pivotable movement about a first axis transverse to and fixed with respect to the central longitudinal axis of the fuselage;
   (b) a second fulcrum fitting pivotally mounted in said wheel-well for rotation about a second fixed axis spaced from said first axis and substantially parallel thereto;
   (c) a pair of leg members each having one end swingably carried by said first fulcrum fitting for movement about an axis normal to the axis of rotation of said first fulcrum fitting to facilitate movement of said leg members into a first, distended position wherein said leg members project downwardly and outwardly from said longitudinal axis and a second position wherein said leg members project downwardly from said longitudinal axis substantially parallel to each other;
   (d) an actuating cylinder having one end pivotally secured to said second fulcrum fitting and an opposite end pivotally connected to said first fulcrum fitting for rotating said fittings about their respective axes; and
   (e) linkage means connected to said leg members and to a portion of said second fulcrum fitting remote from its fixed axis so as to cause said leg members to be spread into said first, distended position when said second fulcrum fitting is pivoted in a first direction by said actuating cylinder and to swing said leg members about said normal axis into said second position when said second fulcrum fitting is pivoted in a second direction preparatory to retracting said landing gear into said wheel-well.

3. A retractable landing gear as defined in claim 2, including:
   (a) a pair of wheel members rotatably mounted on a common axis at the other ends of each of said leg members, said common axes being substantially parallel to the axis of said first and second fulcrum fittings.

4. The landing gear of claim 2 including a crank pin pivotally connecting said opposite, movable end of said cylinder to said first fulcrum fitting and to a first over-lock mechanism, said first over-lock mechanism having a first link keyed to said crank pin and a second link pivotally connected to said first link and to said second fulcrum fitting for locking said leg members in said first, distended position, whereby said crank pin is adapted to swing said first link to release said first over-lock mechanism and unlock said leg members when said opposite, movable end of said cylinder is moved a predetermined amount in a predetermined direction.

5. The landing gear of claim 2 including a second over-lock mechanism comprising a pair of pivotally connected links, a remote end of one said link pivotally secured to a fixed pin and a remote end of said second link connected to said second fulcrum fitting in such a manner that said second over-lock mechanism prevents said leg members from swinging about said first fixed axis to retract said landing gear into said wheel-well until said leg members have been swung from said first, distended position to said second, parallel position.

6. The landing gear of claim 3 including a wheel supporting parallelogram linkage connected to said wheel members and said first fulcrum fitting in such a manner that said parallelogram fitting controls the movement of said leg members about said first fitting in a plane normal to the axis of rotation of said leg members and controls the position of said wheel members in such a manner that said wheel members remain in a proper ground contact position during said movement of said leg members about said first fitting.

7. A retractable landing gear for an airplane comprising:
   (a) a first fulcrum fitting rotatable about a fixed axis;
   (b) a leg member depending from each end of said first fitting and being positionable to a first distended position and a second position substantially prependicular to said first fitting;
   (c) a triangular truss having a base, said truss being base being parallel to and superjacent the axis of said first fulcrum fitting, an apex of said truss being located intermediate said leg members and having a first pin rotatably mounted therein;
   (d) a first link pivotally connecting an end of one of said leg members remote from said first fitting to one end of said first pin;
   (e) a second link pivotally connecting an end of the other of said leg members remote from said first fitting to the other end of said first pin; and
   (f) linear displacement type actuator means connected to said truss adjacent said base and to said first fulcrum fitting, said actuator means being operable in a first direction to swing said apex toward said first fitting thereby causing said links to pull said leg members inward from said distended position to said perpendicular position and operable in a second direction to swing said apex away from said first fitting thereby causing said links to spread said legs from said perpendicular position to said distended position.

8. The landing gear of claim 7 including lever means connecting said actuator means to said first fulcrum fitting for revolving such fitting about its fixed axis to swing said leg members from their depending position to a position substantially normal thereto, and lock means connected to said first fulcrum fitting for preventing said first fulcrum fitting from revolving unless said leg members are in their perpendicular position.

References Cited by the Examiner

UNITED STATES PATENTS

| | | | |
|---|---|---|---|
| 1,353,407 | 9/20 | McCarroll | 244—102 |
| 2,392,892 | 1/46 | Ward | 244—102 |

MILTON BUCHLER, *Primary Examiner.*

ANDREW H. FARRELL, *Examiner.*